United States Patent
Chan et al.

(10) Patent No.: US 11,102,843 B2
(45) Date of Patent: Aug. 24, 2021

(54) PATH CONSTRUCTION UNDER MAC ADDRESS RANDOMIZATION

(71) Applicant: The Hong Kong University of Science And Technology, Kowloon (HK)

(72) Inventors: Shueng Han Gary Chan, New Territories (HK); Lichao Han, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 63 days.

(21) Appl. No.: 16/534,668

(22) Filed: Aug. 7, 2019

(65) Prior Publication Data

US 2020/0053827 A1 Feb. 13, 2020

Related U.S. Application Data

(60) Provisional application No. 62/764,503, filed on Aug. 7, 2018.

(51) Int. Cl.
*H04W 80/02* (2009.01)
*H04L 12/26* (2006.01)
(Continued)

(52) U.S. Cl.
CPC ........... *H04W 80/02* (2013.01); *H04L 1/1642* (2013.01); *H04L 12/4641* (2013.01);
(Continued)

(58) Field of Classification Search
CPC ..... H04W 80/02; H04W 40/04; H04W 40/02; H04L 43/12; H04L 61/6022;
(Continued)

(56) References Cited

U.S. PATENT DOCUMENTS 9,167,554 B1 * 10/2015 Sjolund ................ H04W 64/00
2015/0373692 A1 * 12/2015 Jern ...................... H04W 4/023
370/329
(Continued)

FOREIGN PATENT DOCUMENTS

CN 1834973 A * 9/2006

OTHER PUBLICATIONS

Cunche et al., "Linking wireless devices using information contained in Wi-Fi probe requests", Pervasive and Mobile Computing, 11 (2014), pp. 56-69 (Year: 2014).*
(Continued)

*Primary Examiner* — Shailendra Kumar
(74) *Attorney, Agent, or Firm* — Amin, Turocy & Watson, LLP

(57) ABSTRACT

Constructing and/or recovering paths of mobile devices is enabled. For instance, a method comprises: receiving, by wireless fidelity (Wi-Fi) sensors, respective probes from mobile devices, grouping probes having a same media access control (MAC) address into segments, identifying fingerprints of information elements the mobile devices, grouping segments according to an identified fingerprint, determining an increment of a sequence number corresponding to consecutive segments of a segment group, determining a time gap between the sequence number corresponding to a first probe and an incremented sequence number corresponding to a second probe having a timestamp that is later in time than the first probe, and comparing a growth rate of the sequence number corresponding to the consecutive segments to determine a forward segment of the consecutive segments, resulting in a constructed path of the mobile devices, and storing the constructed path in a database.

20 Claims, 8 Drawing Sheets

(51) Int. Cl.
  H04L 29/12 (2006.01)
  H04L 1/16 (2006.01)
  H04L 12/46 (2006.01)
(52) U.S. Cl.
  CPC ............ H04L 43/106 (2013.01); H04L 43/12 (2013.01); H04L 61/6022 (2013.01)
(58) Field of Classification Search
  CPC .............. H04L 1/1642; H04L 12/4641; H04L 43/106; H04L 61/2038; H04L 61/2092; H04L 43/14
  See application file for complete search history.

(56) References Cited

U.S. PATENT DOCUMENTS

| | | | |
|---|---|---|---|
| 2016/0135053 A1 | 5/2016 | Lee et al. | |
| 2016/0269359 A1 | 9/2016 | Adrangi et al. | |
| 2018/0077742 A1 | 3/2018 | Pang | |
| 2019/0172096 A1* | 6/2019 | Tenant de la Tour | ........................ H04W 12/08 |
| 2019/0295408 A1* | 9/2019 | Wynter | ................ G08G 1/0145 |
| 2019/0334806 A1* | 10/2019 | Sugatoor | ............. H04L 61/6022 |

OTHER PUBLICATIONS

Arackaparambil et al., "On the Reliability of Wireless Fingerprinting using Clock Skews", In Proceedings of the Third ACM Conference on Wireless Network Security (WiSec ' I0). ACM,Mar. 22-24, 2010, pp. 169-174.
Bernardos et al., "Wi-Fi Internet connectivity and privacy: hiding your tracks on the wireless Internet", IEEE Conference on Standards for Communications and Networking (CSCN). IEEE, Tokyo, Japan, 2015, pp. 193-198.
Brik et al., "Wireless Device Identification with Radiometric Signatures", In Proceedings of the 14th ACM International Conference on Mobile Computing and Networking, Sep. 14-19, 2008, pp. 116-127.
Cunche et al., "Linking wireless devices using information contained in Wi-Fi probe requests", Pervasive and Mobile Computing 11, Apr. 2014, pp. 56-69.
Liu et al., "City-Hunter: Hunting Smartphones in Urban Areas", In IEEE 37th International Conference on Distributed Computing Systems (ICDCS), 2017, pp. 162-171.
Martin et al., "A Study of MAC Address Randomization in Mobile Devices and When it Fails", Proceedings on Privacy Enhancing Technologies, Oct. 2017, pp. 365-383.
Martin et al.,"Decomposition of MAC Address Structure for Granular Device Inference", In Proceedings of the 32nd Annual Conference on Computer Security Applications(ACSAC ' 16). ACM, 2016, pp. 78-88.

Matte, "Defeating MAC Address Randomization Through Timing Attacks", In Proceedings of the 9th ACM Conference on Security & Privacy in Wireless and Mobile Networks (WiSec ' 16). ACM, Jul. 18-22, 2016, pp. 15-20.
Vanhoef et al.,"Why MAC Address Randomization is not Enough: An Analysis of Wi-Fi Network Discovery Mechanisms", In Proceedings of the 11th ACM on Asia Conference on Computer and Communications Security (ASIACCS ' 16). ACM, May 30-Jun. 3, 2016, 12 pages.
Andrews et al.,"Integer Partitions", CambridgeUniversity Press, Cambridge, 2004.
Barbera et al., "Signals from the Crowd: Uncovering Social Relationships through Smartphone Probes", In Proceedings of the Conference on Internet Measurement Conference (IMC '13). ACM, New York, Oct. 23-25, 2013, pp. 265-276.
Bloessl et al., "The Scrambler Attack: A Robust Physical Layer Attack on Location Privacy in Vehicular Networks", International Conference on Computing, Networking and Communications (ICNC), 2015, pp. 395-400.
Danev et al., "On Physical-Layer Identification of Wireless Devices", ACM Computing Surveys, vol. 45, No. 1, Article 6, Nov. 2012, 29 pages.
Freudiger et al., "Short: How Talkative is your Mobile Device? An Experimental Study of Wi-Fi Probe Requests", In Proceedings of the 8th ACM Conference on Security & Privacy in Wireless and Mobile Networks, Jun. 22-26, 2015, 6 pages.
Goodin, Dan, "No, this isn't a scene from Minority Report This trash can is stalking you", Ars Technica, Aug. 9, 2013 [https://arstechnica.com/information-technology/2013/08/no-this-isnt-a-scene-from-minority-report-this-trash-can-is-stalking-you/], retrieved Jun. 30, 2020,10 pages.
IEEE Std 802.11, "Wireless LAN Medium Access Control (MAC) and Physical Layer (PHY) Specifications", IEEE Computer Society, 2012, 528 pages.
Leach et al., "Universally Unique Identifier (UUID) URN Namespace", URL: http://www.ietf.org/rfc/rfc4122.txt, 2013, 32 pages.
Pang et al.,"802.11 User Fingerprinting", In Proceedings of the 13th Annual ACM International Conference on Mobile Computing and Networking, 2007, (MobiCom '07). ACM, 2007, 23 pages.
Rademacher, Hans, "On the Expansion of the Partition Function in a Series", Annals of Mathematics, Second Series, vol. 44, No. 3, Jul. 1943, pp. 416-422.
Redondi et al., "Building up knowledge through passive WiFi probes", Building up Knowledge through Passive WiFi Probes. Computer Communications 117, Mar. 7, 2017, 12 pages.
Weppner et al., "Monitoring Crowd Condition in Public Spaces by Tracking Mobile Consumer Devices with WiFi Interface", In Proceedings of the 2016 ACM International Joint Conference on Pervasive, Sep. 12-16, 2016, pp. 1363-1371.

* cited by examiner

PATH CONSTRUCTION UNDER MAC ADDRESS RANDOMIZATION

RELATED APPLICATION

The subject patent application is a continuation of, and claims priority to, U.S. Patent Application No. 62/764,503, filed Aug. 7, 2018, and entitled "PATH CONSTRUCTION UNDER MAC ADDRESS RANDOMIZATION," the entirety of which application is hereby incorporated by reference herein.

TECHNICAL FIELD

The subject disclosure generally relates to constructing and/or recovering the paths of mobile devices using media access control (MAC) addresses of the mobile devices.

BACKGROUND

Conventional Wi-Fi enabled devices periodically perform active scans by broadcasting probe requests to discover their nearby access points (APs). These probe requests contain the devices' globally unique physical MAC addresses. A sniffing router can collect probe requests and chronologically order the probe requests' physical addresses. If the positions of the probe requests are known, users holding devices can be tracked over time and the behavior of the user carrying the device can be analyzed over time. For example, a shopping mall can utilize the technique to analyze shoppers' preferences, monitor crowds, calculate customer dwell times, or infer the social relationships of mobile users.

In this regard, constructing and/or recovering the paths of mobile devices is proliferating and becoming commercially feasible in the marketplace. However, constructing and/or recovering the paths of mobile devices has raised concerns regarding user privacy. To protect user privacy, MAC address randomization has been recently deployed when mobile devices are unassociated with any AP, where the mobile devices use randomized virtual MAC addresses in their probe broadcasts, and regenerate another randomized address at unpredictable intervals (ranging from seconds to minutes). MAC address randomization fragments the path of the user of a device into short segments, which breaks the path continuity and defeats analytics over the long term. Examples of such randomization include iOS 8 (or above), Android 6.0 (or above), Windows 10, and Linux.

A consequence of MAC address randomization is that all the probe requests of a certain mobile device no longer share the same address. As such, the chronological ordering based on the same address as mentioned above results in many fragmented and uncorrelated probe segments of short duration, which effectively disrupts tracking continuity. It is presently challenging to trace a mobile device over time due to the above-mentioned short duration probe segments.

Presently, when mobile devices that have adopted MAC address randomization are connected to a WiFi network, they use their physical MAC addresses in the probes. In such cases, the mobile devices can be tracked according to their physical MAC addresses.

The above-described background relating to constructing and/or recovering the paths of mobile devices is merely intended to provide a contextual overview of some current issues, and is not intended to be exhaustive. Other contextual information may become further apparent upon review of the following detailed description.

SUMMARY

The following presents a summary to provide a basic understanding of one or more embodiments. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, methods, devices, and/or computer-readable storage devices that can receive probe requests from mobile devices not associated with any AP that broadcast virtual MAC addresses, and, based on the probe requests, construct paths of the mobile devices, where the probe requests are represented with a virtual MAC address are described.

In the following embodiments, a path is defined as the chronologically ordered sequence of the nodes of the same mobile device, each node represents a probe request with a timestamp, and consecutive nodes of the same MAC address is a segment. In active scans, devices encapsulate their features, capabilities, and configurations into frames known as Information Elements (IEs) in their probe requests. IEs can be used as a fingerprint to distinguish segments from different mobile devices.

The IEEE 802.11 standard requires that every MAC address layer frame contains a sequence number (SEQ), which increases by one for each new probe request. When scanning for available APs in its proximity, a mobile device sends probe requests on all available channels in a round robin manner. As such, the gap of the SEQ after each round of scanning is expected to be the same.

The following embodiments describe novel approaches to construct and recover the path of a mobile device by concatenating the segments, given a pool of probes generated by possibly multiple devices. The novel approaches described herein use the fingerprint of a mobile device's IEs and analyze the SEQs of the mobile device to construct the path of each mobile device. The resulting constructed paths, which consist of concatenated segments, make it possible to derive a much larger set of longer-term aggregated or individualized statistics, such as dwell time, occupancy heatmap, user trajectory, shopper behavior, and so on.

According to an embodiment, a method is provided. The method comprising: receiving, by at least one wireless fidelity (Wi-Fi) sensor, respective probes from mobile devices of a group of mobile devices, wherein the mobile devices in the group of mobile devices have respective media access control (MAC) addresses, wherein the respective probes have respective timestamps, and wherein the respective MAC addresses have respective sequence numbers; grouping probes of the respective probes having a same MAC address to form at least one segment, wherein the at least one segment corresponds to the probes having the same MAC addresses; identifying at least one fingerprint of at least one information element of at least one mobile device of the group of mobile devices, resulting in at least one identified fingerprint; grouping the at least one segment according to the at least one identified fingerprint, resulting in at least one segment group corresponding to an identified fingerprint of the at least one identified fingerprint; determining at least one forward segment of consecutive segments of a segment group of the at least one segment group, resulting in a constructed path of the at least one mobile device, wherein the at least one forward segment comprises a segment of the consecutive segments with at least one probe having a timestamp that is later in time than other probes of other segments of the consecutive segments, and wherein the constructed path comprises a chain of the consecutive segments in the at least one segment group; and storing the constructed path in a database.

In another embodiment, a device is provided. The device can comprise at least one wireless fidelity (Wi-Fi) sensor; a processor; and a memory that stores executable instructions that, when executed by the processor, facilitate performance of operations, comprising: receiving, by at least one wireless fidelity (Wi-Fi) sensor of the device, respective probes from mobile devices of a group of mobile devices, wherein the mobile devices have respective media access control (MAC) addresses, wherein the respective probes have respective timestamps, wherein the respective MAC addresses have respective sequence numbers, and wherein the respective probes are received from the mobile devices via at least one channel; sending the respective probes to a server; grouping probes of the respective probes having a same MAC address to form segments, wherein the segments correspond to the probes having the same MAC address; identifying fingerprints of information elements of the mobile devices in the group of mobile devices, resulting in identified fingerprints; grouping the segments according to the identified fingerprints, resulting in segment groups corresponding to a fingerprint of the identified fingerprints; determining forward segments of consecutive segments of the segment groups, resulting in a constructed path of the mobile devices, wherein the forward segments comprise segments of the consecutive segments with probes having later in time timestamps than other probes of other segments of the consecutive segments, and wherein the constructed path comprises a chain of the consecutive segments in the segment groups; and storing the constructed path in a data store.

According to another embodiment, a computer-readable storage device is provided. The computer-readable storage device can have executable instructions stored thereon that, in response to execution, cause a device comprising a processor to perform operations, comprising: receiving, by at least one sensor of the device, at least one respective probe from a target mobile device of a group of mobile devices, wherein the target mobile device has a respective virtual media access control (MAC) address, wherein the at least one respective probe has at least one respective timestamp, and wherein the respective virtual MAC address has a respective sequence number; in response to sending the at least one respective probe to a server, receiving, from the server, probes of the at least one respective probe that have been grouped by the server, based on the probes having a same virtual MAC address, to form at least one segment, wherein the at least one segment corresponds to the probes having the same virtual MAC address; identifying a fingerprint of an information element of the target mobile device in the group of mobile devices, resulting in a target fingerprint; grouping the at least one segment according to the target fingerprint, resulting in at least one segment group corresponding to the target fingerprint; and determining a forward segment of consecutive segments of the at least one segment group, resulting in a constructed path of the target mobile device, wherein the forward segment comprises a segment of the consecutive segments with first probes having later in time timestamps than second probes of other segments of the consecutive segments, and wherein the constructed path comprises a chain of the consecutive segments of the at least one segment group.

DETAILED DESCRIPTION

Figure 1:
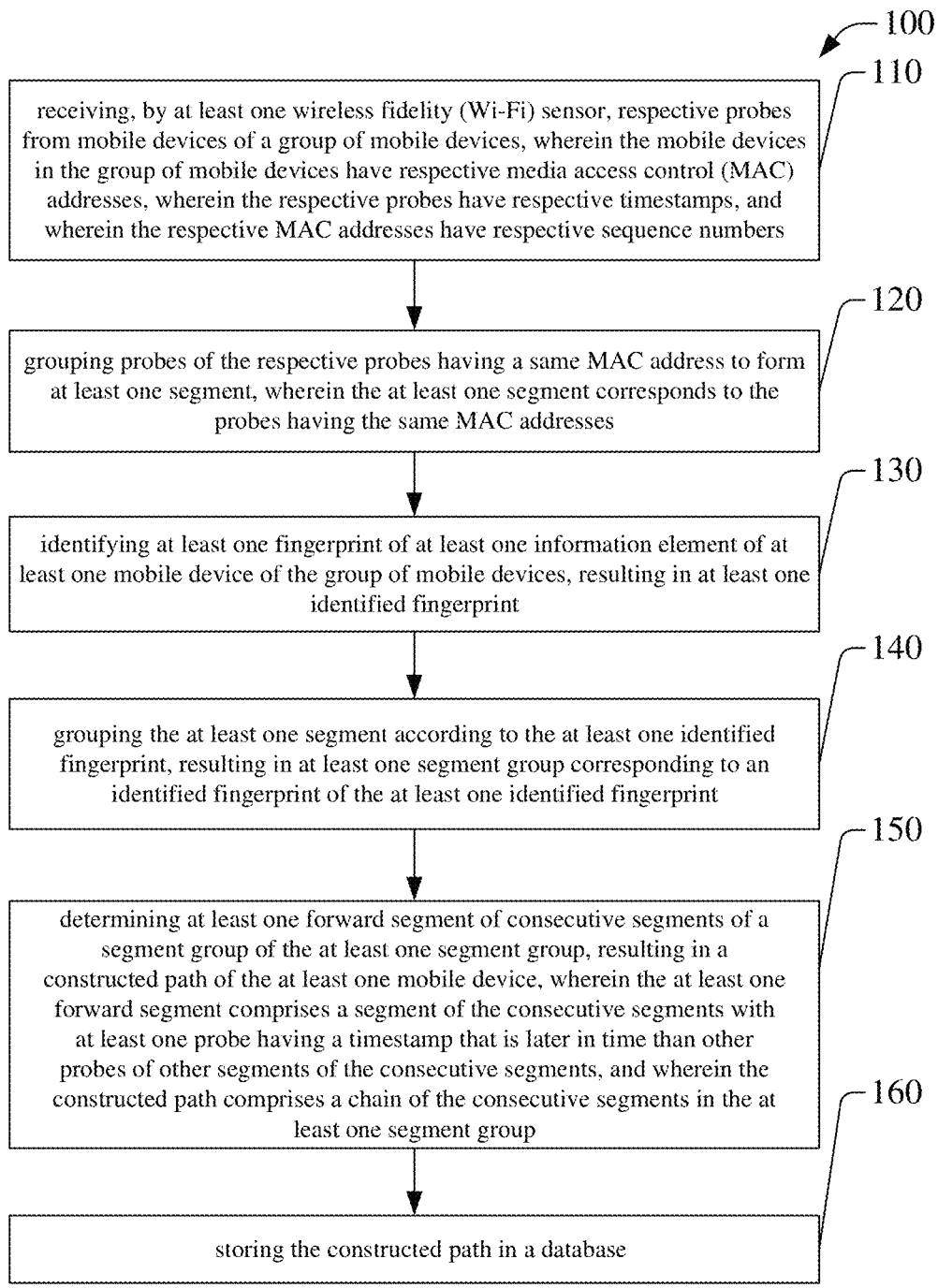
FIG. 1 illustrates an example flowchart of a method for constructing and/or recovering a path of a mobile device, where probes are received from mobile devices, probes having a same MAC address are grouped to form at least one segment, at least one fingerprint of an information element of at least one mobile device is identified, the at least one segment is grouped into at least one segment group according to at least one identified fingerprint, at least one forward segment of consecutive segments of the at least one segment group is determined, and a constructed path of the mobile device is stored in a database, in accordance with various example embodiments.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

For all ensuing embodiments described herein, a timestamp of a probe is defined as a node, a sequence of probes sent into different channels before loop-back is defined as a round, and consecutive probes sent on the same channel in a round is defined as a burst. Since the virtual MAC address of a mobile device does not change within the same round and remains the same for several consecutive rounds, a chain of rounds that share the same virtual MAC address is defined as a segment. Within a round, bursts are sent on different channels. A path of a device is defined as a chain of segments concatenated in time order. On a path, given a segment, a forward segment is defined as the adjacent segment that appears after its adjacent segment.

Two evaluation metrics can be used to evaluate the efficacy of an algorithm that constructs and/or recovers a path of a mobile device: F-Measure and Degree of Concatenation (DOC).

F-Measure is defined as:

$$F\text{measure}=(2\cdot\text{Precision}\cdot\text{Recall})/(\text{Precision}+\text{Recall}) \quad [EQ1]$$

In the above equation (e.g., EQ1), Precision and Recall are defined as:

$$\text{Precision}=TP/(TP+FP) \quad [EQ2]$$

and $$\text{Recall}=TP/(TP+FN) \quad [EQ3].$$

In the above equations (e.g., EQ2 and EQ3), TP, FP and FN are defined as follows. Suppose there is a device d. Let D be the sets of all segments transmitted during an observation period. After performing an algorithm (that constructs and/or recovers a path of a mobile device) on a dataset, the path construction p for d is obtained, where p is a chain of segments with different virtual MAC addresses. When more than one p is assigned to the same device, a p that contains the most number of different segments is chosen to represent the device d. If P represents a set of segments in p:

TP is True Positive, where:

$$TP=|P \cap D| \quad [EQ4]$$

FP is false positive, where:

$$FP=|P-P \cap D| \quad [EQ5]$$

FN is False negative, where:

$$FN=|D-P \cap D| \quad [EQ6]$$

For example, suppose that there is one device which transmits 10 segments (e.g., 10 virtual MAC addresses), if an algorithm (that constructs and/or recovers a path of a mobile device) only constructs 9 of the transmitted segments as one device and no other segments with other virtual MACs. The F-measure in this example case is 94.7%.

F-measure concentrates on the correctness of the segments within each constructed path. If more than one p is assigned to the same device, F-measure cannot depict to what degree an algorithm (that constructs and/or recovers a path of a mobile device) can compact the segments from the same device together. That is to say, the smaller the number of paths constructed for a single devices and the longer the longest path among these paths is, the better an algorithm (that constructs and/or recovers a path of a mobile device) should perform.

Degree of Concatenation (DOC), which is used to evaluate the level of fragmentation of the constructed paths from a single device and measures the degree of fragmentation of the resultant paths belonging to the same device, is defined as follows. In number theory, the integer partition problem is to find a way to write an integer n as a sum of the positive integers. For example, 4 can be partitioned in five distinct ways: (1) partition (sorted order): 4 (score: 5), (2) partition (sorted order): 3+1 (score: 4), (3) partition (sorted order): 2+2 (score: 3), (4) partition (sorted order): 2+1+1 (score: 2), and (5) partition (sorted order): 1+1+1+1 (score: 1). Different order-dependent compositions of summands in each partition are the same thing, for example, 1+3 and 3+1 are the same partition. If P(n) represents the number of partitions of integer n. A closed-form expression for P(n) is given. Each way of partitioning is called a partition. Supposing that a partition of n has q summands, the partition is denoted by:

$$n = \sum_{i=1}^{q} s_i, \quad [EQ7]$$

where $s_i \geq s_j$ for $1 \leq i < j \leq q$, $s_i$ and $s_j$ are the number i and j summands of this partition. All the partitions are sorted by $s_1$, then $s_2$ if the $s_1$ of two partitions are the same, and so on in descending order. P(n) is assigned as a score to the largest partition, and P(n)−1 is assigned as a score to the second largest partition (and so on).

For example, the score of the partition 2+2 is 3 while the score of the partition 2+1+1 is 2. With the definitions above, DOC is defined as:

$$DOC = \frac{\text{Score of the partition}}{P(n)}. \quad [EQ8]$$

For example, if one device transmits 6 segments with 6 different virtual MAC addresses, the algorithm (that constructs and/or recovers a path of a mobile device) constructs 3 paths, the first path has 4 segments belonging to the device while another 2 paths have 1 segment each, and there are no other segments in those 3 paths. In such a case, the F-measure metric will give 80%. However, the DOC metric in this example case is 72.7%. The DOC metric can provide a supplementary evaluation on an algorithm (that constructs and/or recovers a path of a mobile device) from a different perspective.

Embodiments of the methods, devices, and computer-readable storage devices described herein can construct and/or recover a path of a mobile device by concatenating and sequencing the transmitted probe requests of mobile devices emitting virtual MAC addresses. Specifically, embodiments of the methods, devices, and computer-readable storage devices described herein are based on observations of the IEs and SEQs in the probe requests of mobile devices.

Embodiments of the methods, devices, and computer-readable storage devices described herein use Wi-Fi sensors that collect the probes transmitted from devices. The collected probes with the same virtual MAC address(es) are grouped to form segments.

In some embodiments, after collecting the probes transmitted from the devices, the collected probes are sent to a server, and the server groups the collected probes with the same virtual MAC address(es) to form segments.

In other embodiments, the server is a cloud server.

After the collected probes with the same virtual MAC address(es) are grouped into segments, fields of IEs that remain invariant over time and that may be uniquely associated with a device as the fingerprint of the device are identified. The segments are grouped according to the same IE fingerprints.

Since there may be multiple devices, SEQ analysis is used on each group of segments with the same IE fingerprint to construct paths for individual devices. Active scan is performed iteratively on available channels, and an increment of the SEQ is calculated after each active scan iteration. This calculation captures how the SEQs are incremented with respect to the number of available channels in a country or region. Guided by the calculated increment on the SEQs, a segment can identify its potential subsequent segments. Because more than one subsequent segment may fulfill the SEQ increment, the growth rate of the SEQs of consecutive segments are compared to construct the path of the device(s). The resultant paths are then stored in a database.

In some embodiments, a gap between the SEQs of consecutive segments and a growth rate of the SEQs of consecutive segments are used to construct the path of the device(s). In some embodiments, only a gap between the SEQs of consecutive segments is used to construct the path of the device(s). In other embodiments, only the growth rate of the SEQs of consecutive segments is used to construct the path of the device(s). In other embodiments, only the first node and the last node in a round are considered in calculating the SEQ gap.

The main parameter influencing the performance of embodiments of the methods, devices, and computer-readable storage devices described herein is the maximum time ($\Delta T$) that a segment tries to find its forward segment. In some embodiments the maximum inter-round time (the time gap between two consecutive rounds sending out by the same device) of mobile devices is 350 seconds. As such, the time gap between a segment and its forward segment is less than 350 seconds. In some embodiments, $\Delta T$ can be set at 350 seconds as the default. In other embodiments, only the first node and the last node in a round will be considered when performing the SEQ gap calculation to construct the path of the device(s).

Probe requests of mobile devices are used to perform an active scan process when a mobile client wants to discover available nearby APs. Within a probe request, an 802.11 device can use IEs (or tagged parameters) to broadcast their capabilities and configurations to accessible APs. The IEEE 802.11 standard defines that each IE consists of 1 octet Element ID field (assigned by the standard), 1 octet Length field (length of the Information field), and an element-specific Information field.

IEs can be used to differentiate devices because: (1) some IEs are optional, as such, the set of IEs of different devices may vary, (2) the capabilities of different devices vary, as such, the contents of IEs are different, and (3) some vendors can specify certain IEs because the 802.11 standard allows non-standard vendor-specific IEs to meet the desire for flexibility and different constraints, which make some devices more distinct from others. Whether an IE changes (or not) has no relationship with whether devices change their MAC addresses (or not). The invariance of an IE indicates the percentage of segments that contain this IE and the value of this IE does not change over time. The universality of an IE indicates the percentage of segments that include this IE in their probes.

Embodiments of the methods, devices, and computer-readable storage devices described herein consider IEs with high invariance and high universality to form the fingerprint of a device and call it the IE fingerprint. Concretely, the IE fingerprint consists of Supported rates, Extended Supported Rates, HT Capabilities, Extended Capabilities, DSSS Parameter Set, Interworking and Vendor Specific.

An IE fingerprint cannot uniquely identify a device, but, if segments are grouped according to their IE fingerprints, it can reduce the range of possible subsequent segments when a segment is finding its next segment, which can increase the accuracy when the path of the device(s) is constructed.

The following is an example algorithm for IE fingerprinting:

Algorithm 1 (Information Element Fingerprinting):

Input: $L_{probe}$ : a list of probe requests.
Output: $D_{ief}$ : a dictionary of segments with key ief.
$D_{ief} \leftarrow \{ \}$
Segments ← aggregate all probes in $L_{probe}$ by mac
foreach segment in Segments do
    if $D_{ief}$ contains segment's ief then
        $D_{ief}$ [ief] ← $D_{ief}$ [ief] ∪ segment
    else
        $D_{ief}$ [ief] ← [segment]
    end
end In the above algorithm (Algorithm 1), mac denotes the same MAC address and ief denotes the same IE fingerprint value, and the probes are concatenated chronologically according to mac to form a segment. Then the segments are inserted into a dictionary, denoted by $D_{ief}$, with ief as the key, where the resultant $D_{ief}$ is passed over to subsequent algorithms, SEQ analysis, to do further aggregation. Then the segments are grouped according to their IE fingerprints.

For example, if there are 3 devices broadcasting their probes with virtual MAC addresses, each MAC address is given an ID and then probes that share the same virtual MAC address are concatenated together to form the segments.

Probe requests are a type of management of frames. The IEEE 802.11 standard specifies that every management frame contains a unique SEQ, which is in a 12-bit field and its value is modulo 4,096. An 802.11 device increments the SEQ by one every time a frame comes out and it remains the same for each fragmented frame. Therefore, the monotonic increasing and wrap-around characteristics of the SEQs in the probe requests can be made use of to track the 802.11 devices.

While performing active scans, devices iterate to send out probes on all available channels allowed in a country or region to discover as many APs as possible. When the devices are not connected to APs, rounds from the same device are consecutive in the SEQ and there is no relationship with whether the device changes its MAC address between two consecutive rounds. In the same round, the average size of a burst is a constant, which is generally one or two. For some devices that have not adopted randomization, this number may be larger because they prefer to broadcast more probes with the SSIDs of the APs they have connected to before on the same channel.

The maximum length of a round is proportional to the number of available channels allowed in a region or country and the ratio is the average size of a burst within that round. Devices send several probes on the same channel continuously and perform the same process on the all available channels iteratively. Therefore, it is possible to use the SEQs of a round to calculate the range of SEQs of the next round.

In some embodiments, the order of channels in active scans is different but not randomized, so the gap between successive SEQs in a channel is narrowly distributed. Embodiments of the methods, devices, and computer-readable storage devices described herein can use the minimum SEQ of each burst to determine the gap. In some embodiments, the occurrence of double or triple consecutive peaks is due to the size of the burst, and the growth rate of SEQs varies among different devices and remains stable within a period of time. When devices are awake, due to user operations on the devices or some push notifications, the growth rate of SEQs tends to speed up compared with that in the sleep mode. In other embodiments the recent SEQ growth rate can represent the recent status of the devices.

In some embodiments, a path of a device is a chain of consecutive segments. Constructing a path for a device can be achieved by finding a forward segment for a segment iteratively. For convenience, $s_A$ is used to represent a segment with virtual MAC A and $s_B$ is used to represent a segment with virtual MAC B (and so on). In order to determine whether $s_B$ is the forward segment of $s_A$, the set of timestamps of two segments is examined because a forward segment must appear later than a given segment. A maximum time $\Delta T$ is set to find the forward segments and eliminate impossible candidates. The timestamps of the probes are depicted within $s_A$ and $s_B$ as $T_A$ and $T_B$ respectively. Therefore, the following condition $C_1$ must hold if $s_B$ is the forward segment of $s_A$:

$$C_1: 0 < \min(T_B) - \max(T_A) < \Delta T. \quad [EQ9]$$

The condition $C_1$ (above) is insufficient alone to decide whether $s_B$ is the forward segment of $s_A$ because there are many segments which fulfill the condition $C_1$ besides $s_B$. Next, impossible segments are eliminated that satisfy $C_1$ by examining their SEQs.

Rounds from the same device are consecutive in SEQs. When a segment is finding its forward segment, only the last round and the first round of its forward segment have an effect.

In some embodiments, $lr_A$ denotes the last round of $s_A$, and $fr_B$ denotes the first round of $s_B$, and if $FSEQ_A$ and $LSEQ_A$ denote the SEQs of the first node and last node received in $lr_A$ respectively. $FSEQ_B$ and $LSEQ_B$ are defined in a similar way. In $lr_A$, the known length of SEQs, $Len_A$, can be calculated by:

$$Len_A = D(FSEQ_A, LSEQ_A) + 1, \quad [EQ10]$$

where G is the gap of two sequence numbers computed by:

$$G(SEQ_1, SEQ_2) = (SEQ_2 - SEQ_1)\%4096. \quad [EQ11]$$

In [EQ11] (above), the difference is modulo by 4096, so it can handle the wrap-around situation. $Len_B$ is computed in the same way.

In other example embodiments, the length of a round is proportional to the available channels with the average size of the burst as the ratio. Therefore, the maximum length of the round, denoted by Max(r), can be computed by:

$$\mathrm{Max}(r) = N^* \mathrm{size}(r), \quad [EQ12]$$

where N is the maximum number of available channels in a country or region and size(r) is the average size of the burst within a round r. They are all constant numbers given a round and a country or region.

The maximum SEQ gap, denoted by $Gap_{max}$, between $FSEQ_B$ and $LSEQ_A$ can be calculated by:

$$Gap_{max} = \mathrm{Max}(A) + \mathrm{Max}(B) - Len_A - Len_B + 1. \quad [EQ13]$$

If $s_B$ is the next segment of $s_A$, the following condition should hold:

$$C_2: 1 \le G(LSEQ_A, FSEQ_B) \le Gap_{max}. \quad [EQ14]$$

Whether $s_B$ is the forward segment of $s_A$ depends on if the following condition holds:

$$\mathrm{Condition}(s_A, s_B, \Delta T) = C_1 \& C_2. \quad [EQ15]$$

As a result of the above operations, the order of channels is not randomized. With a well selected distribution of sniffing channels of the sensors, $Gap_{max}$ is effectively decreased using [EQ13]. Even though possible channel randomization may come out and there are sometimes no probes sent on a few channels, [EQ13] and [EQ14] can still work well because they are adaptive and consider the worst case by giving the smallest and biggest SEQ gap. In [EQ15], $C_1$ describes the time requirement while $C_2$ describes the SEQ requirement and behaves like a bandwidth filter to eliminate impossible segments effectively when a segment is finding its forward segment. In some example embodiments, the SEQ gap calculation only considers the first node and last node in a round.

In some embodiments, a forward segment can be found if the condition in [EQ15] (above) holds. In other example embodiments, more than one forward segment fulfills the condition. In order to make a further decision among these possible forward segments, a growth rate of the SEQ can be used as a criterion to distinguish them.

Given a segment $s_A$, the SEQs of the first node and last node can be denoted by $FNSEQ_A$ and $LNSEQ_A$ and the timestamps of the first node and last node can be denoted by $FNTS_A$ and $LNTS_A$. The absolute SEQ growth rate can be determined by:

$$\mathrm{Rate}(s_A) = \frac{D(FNSEQ_A, LNSEQ_A)}{LNTS_A - FNTS_A}, \quad [EQ16]$$

where $D(FNSEQ_A, LNSEQ_A)$ is defined in [EQ11] (above). $\gamma(s_A, s_K)$ denotes the relative SEQ growth rate between a segment $s_A$ and its possible forward segment $s_K$, $\gamma(s_A, s_K)$, and the relative SEQ growth rate between a segment $s_A$ and its possible forward segment $s_K$, can be determined by:

$$\gamma(s_A, s_K) = \frac{|\mathrm{Rate}(s_K) - \mathrm{Rate}(s_A)|}{\mathrm{Rate}(s_A)}. \quad [EQ17]$$

where the rounds with the lowest relative growth rate are the forward segment of $s_A$.

The following is an example algorithm for SEQ analysis:

---
Algorithm 2 (Sequence Number Analysis):

---
Input: $D_{ief}$ and $\Delta T$
Output: Paths: all constructed paths.
Paths ← [ ]
foreach ief in $D_{ief}$ do
    Segments ← $D_{ief}$[ief]
    PartialPaths = core(Segments, $\Delta T$, False)
    Paths = core(PartialPaths, $\Delta T$, True)
end

---

In some embodiments, after applying Algorithm 1 (above), the segments are aggregated by their IE fingerprints into a dictionary, denoted by $D_{ief}$. For each group of segments with the same key ief, sequence number analysis (SEQA) can be applied using the above algorithm (Algorithm 2) to construct the complete paths for devices by calling the core function two times.

The following is an example algorithm for constructing paths:

---
Alorithm 3 (Core Function):

---
Input: L, $\Delta T$ and flag.
Output: Paths: constructed paths.
Paths ← [ ], sort L by the beginning time
seg ← L[0], remove seg in L     //Finding next for it
while L is not null do
    path ← seg     //Connect it to the path
    while 1 do
        segs ← segments that fulfill condition $C_1$ & $C_2$
        next ← null
        if flag then     // The first call
            if segs.size is 1 then
                next ← segs[0]
            else     // The second call
                next ← s in segs with the minimum γ
        end
        if next is null then
            seg ← L[0], remove seg in L, Paths ← path
            break
        concatenate next to path and remove next in L
        seg ← L[0]
    end
end

---

The above algorithm (Algorithm 3) is the core function, and is a deep-first algorithm with three inputs: L a list of segments, $\Delta T$, the maximum time to find the forward segments, and flag, a flag to indicate whether to check the growth rate condition. The aim of the first call to the core function is only to consider the SEQ gap condition because SEQ growth rate may relatively fluctuate a lot within a very small period of time. In some example embodiments, the SEQ gap is given a priority and the segments are left disconnected when more than one forward segment is found. In the call of the core function in this example embodiment, the flag is set as False.

After the core function is first called, partially constructed paths are obtained, denoted by PartialPaths. Each PartialPath is a chain of segments, representing a partial path of a device. After obtaining the partially constructed paths, the core function is called a second time on PartialPaths to construct complete paths for devices by considering the SEQ growth rate condition. The flag is set as True this time. In the second call of the core function, a few recent adjacent rounds between a segment and its possible forward segments are chosen to determine the relative growth rate, as the growth rate may vary after a long time. If two or more PartialPaths are found as a possible next PartialPath of a PartialPath, the PartialPath with the minimum relative growth rate is chosen as the next PartialPath.

Algorithm 2 (the SEQ analysis algorithm) is illustrated by the following example. In this example, SEQ analysis is applied to construct paths for three devices. First, the SEQ gap is used to construct partial paths. When the SEQ gap is used to find the forward segment of a segment, more than one subsequent segment is found and those segments are left disconnected. After checking the SEQ gap condition, the growth rates of every two partial paths are compared to further concatenate them into complete paths. The partial paths are then connected into complete paths.

The overall time complexity of the process is $O(kn^2)$, where n is the number of segments and there are k IE fingerprints. This is because the core function is a deep-first algorithm, whose time complexity is $O(n^2)$.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

Addressing the above and other issues associated with constructing and/or recovering the paths of mobile devices, various embodiments disclosed herein can, by receiving respective probes from mobile devices of a group of mobile devices; grouping probes of the respective probes having a same MAC address to form at least one segment; identifying at least one fingerprint of at least one information element of at least one mobile device of the group of mobile devices; grouping the at least one segment into at least one segment group according to the identified fingerprints; determining at least one forward segment of consecutive segments of the at least one segment group, resulting in a constructed path; and storing the constructed path, construct and/or recover the paths of mobile devices.

In this regard, and now referring to FIG. 1, an example flowchart of a method for constructing and/or recovering the paths of mobile devices is illustrated, in accordance with aspects of the subject disclosure. At 110, method 100 can comprise receiving, by at least one wireless fidelity (Wi-Fi) sensor, respective probes from mobile devices of a group of mobile devices, wherein the mobile devices in the group of mobile devices have respective media access control (MAC) addresses, wherein the respective probes have respective timestamps, and wherein the respective MAC addresses have respective sequence numbers. At 120, method 100 can comprise grouping probes of the respective probes having a same MAC address to form at least one segment, wherein the at least one segment corresponds to the probes having the same MAC addresses. At 130, method 100 can comprise identifying at least one fingerprint of at least one information element of at least one mobile device of the group of mobile devices, resulting in at least one identified fingerprint. At 140, method 100 can comprise grouping the at least one segment according to the at least one identified fingerprint, resulting in at least one segment group corresponding to an identified fingerprint of the at least one identified fingerprint. At 150, method 100 can comprise determining at least one forward segment of consecutive segments of a segment group of the at least one segment group, resulting in a constructed path of the at least one mobile device, wherein the at least one forward segment can comprise a segment of the consecutive segments with at least one probe having a timestamp that is later in time than other probes of other segments of the consecutive segments, and wherein the constructed path can comprise a chain of the consecutive segments in the at least one segment group. At 160, method 100 can comprise storing the constructed path in a database. For the avoidance of doubt, the group of mobile devices can comprise one mobile device or a plurality of mobile devices. In addition, it is noted that any embodiment described herein with reference to one Wi-Fi sensor can apply to one or more Wi-Fi sensors, and similarly, any embodiment described herein with reference to one received probe can apply to one or more received probes.

Optionally, the MAC addresses at blocks 110 and 120 of method 100 can further comprise virtual MAC addresses.

In other embodiments, at block 140, the at least one segment group can comprise at least two adjacent segments, wherein a first probe with a latest in time timestamp than other first probes in a first segment of the at least two adjacent segments and a second probe with an earliest in time timestamp than other second probes in a second segment of the at least two adjacent segments are consecutive timestamps, wherein a time between the at least two adjacent segments is less than a defined number of seconds, and wherein the at least one segment group can comprise the at least one segment having the probes of the respective probes with the same MAC address that is a different MAC address from other segments of the at least one segment group.

In alternative embodiments, at block 130, the at least one information element can comprise an octet element identification field, an octet length field, and an element-specific information field.

In another example embodiment, at block 140, the grouping of the at least one segment according to the at least one identified fingerprint can comprise: chronologically concatenating the probes having the same MAC address according to ones of the respective timestamps corresponding to the probes; and inserting the at least one segment into a dictionary, wherein the dictionary can comprise stored segments from previous groupings of segments.

In other embodiments, at block 150, the timestamp is a first timestamp, and the determining the at least one forward segment can comprise: determining an increment of at least one sequence number of the respective sequence numbers corresponding to the consecutive segments of the segment group of the at least one segment group, resulting in an incremented sequence number; and determining a time gap between a sequence number of the at least one sequence number corresponding to a first probe and the incremented sequence number corresponding to a second probe having a second timestamp that is later in time than the first probe.

In alternative embodiments, at block 150, the determining the at least one forward segment can comprise: determining an increment of at least one sequence number of the respective sequence numbers corresponding to the consecutive segments of the segment group of the at least one segment group, resulting in an incremented sequence number; and comparing a growth rate of the at least one sequence number corresponding to the consecutive segments.

In another example embodiment, at block 150, the determining the at least one forward segment can comprise: determining an increment of at least one sequence number of the respective sequence numbers corresponding to the consecutive segments of the segment group of the at least one segment group, resulting in an incremented sequence number, and the determining the increment can comprise: incrementing the at least one sequence number by one in response to a probe being received from a mobile device of the group of mobile devices with a MAC address that matches a previously sent probe, resulting in at least one incremented sequence number.

Figure 2:
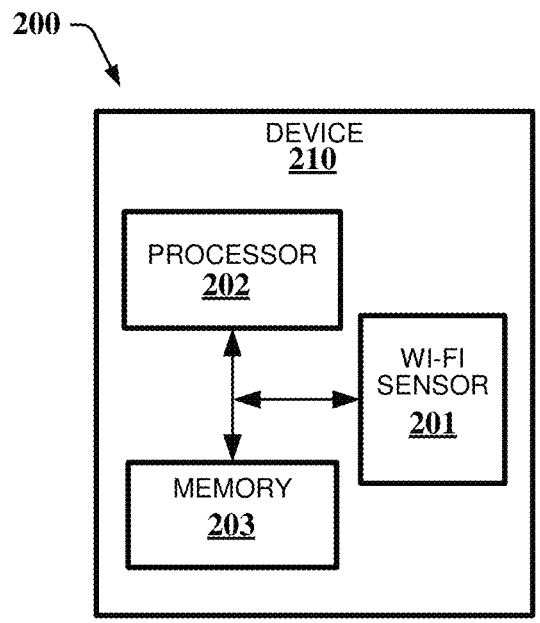
FIG. 2 illustrates a block diagram of an example device that comprises at least one Wi-Fi sensor, a processor and a memory that, when executed by the processor, facilitate performance of operations of constructing and/or recovering a path of a mobile device, in accordance with various example embodiments.

In this regard, and now referring to FIG. 2, a non-limiting, example block diagram 200 is shown of a device 210 that constructs and/or recovers the paths of mobile devices, in accordance with various example embodiments. The device 210 can comprise at least one wireless fidelity (Wi-Fi) sensor 201, a processor 202, and a memory 203 that stores executable instructions that, when executed by processor 202, facilitate performance of operations 400 (not pictured) of constructing and/or recovering a path of a mobile device, in accordance with various example embodiments. Wi-Fi sensor(s) 201, Processor 202 and memory 203 are communicatively coupled to facilitate performance of operations 400 (e.g., constructing and/or recovering the paths of mobile devices).

Figure 3:
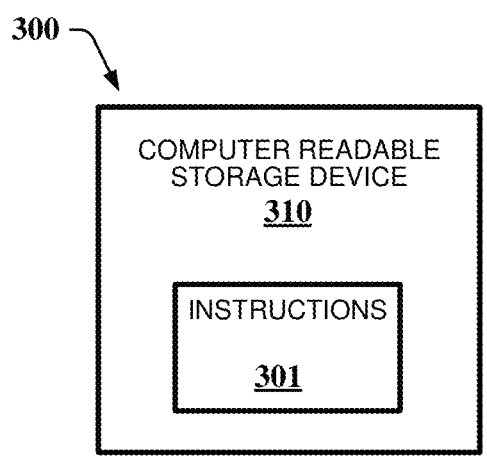
FIG. 3 illustrates a block diagram of an example computer-readable storage device having executable instructions stored thereon that, in response to execution, cause a device comprising a processor to perform operations of constructing and/or recovering a path of a mobile device, in accordance with various example embodiments.

Now referring to FIG. 3, a block diagram of an example computer-readable storage device 310 having executable instructions 301 stored thereon that, in response to execution, cause a device comprising a processor (not pictured) to perform operations 500 (not pictured) of constructing and/or recovering a path of a mobile device, in accordance with various example embodiments.

Figure 4:
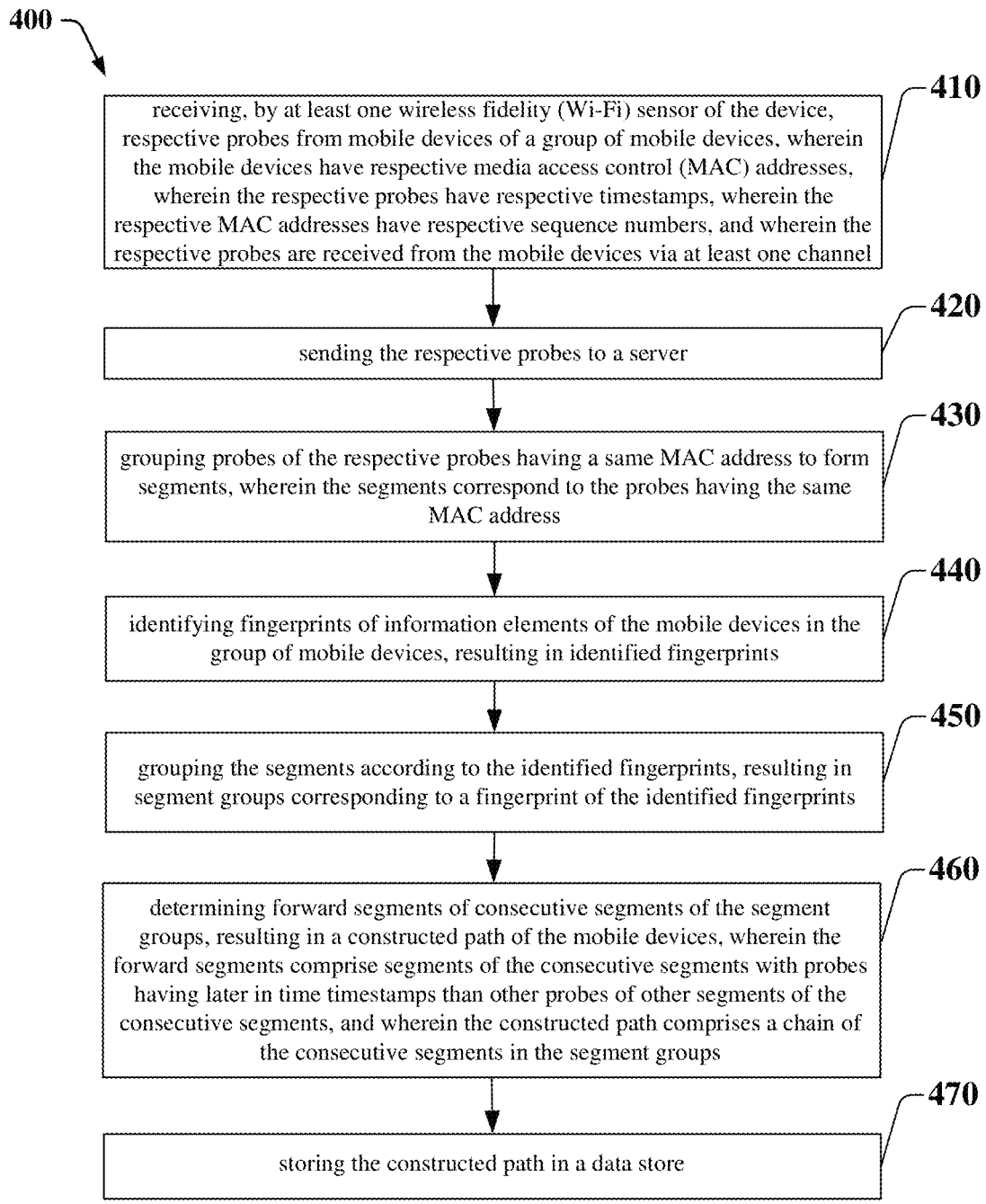
FIG. 4 illustrates an example flowchart of the operations of the device illustrated in FIG. 2, the operations comprising constructing and/or recovering a path of a mobile device, where probes are received from at least one mobile device by a server, probes having a same MAC address are grouped to form segments, fingerprints of information elements of mobile devices are identified, the segments are grouped into segment groups according to identified fingerprints, forward segments of consecutive segments of the segment groups are determined, and a constructed path of the mobile device is stored in a database, in accordance with various example embodiments.

Now referring to FIG. 4, a sequence diagram of example operations 400 of device 210 illustrated in FIG. 2, in accordance with various example embodiments. At 410, operations 400 can comprise receiving, by at least one wireless fidelity (Wi-Fi) sensor of the device, respective probes from mobile devices of a group of mobile devices, wherein the mobile devices have respective media access control (MAC) addresses, wherein the respective probes have respective timestamps, wherein the respective MAC addresses have respective sequence numbers, and wherein the respective probes are received from the mobile devices via at least one channel. At 420, operations 400 can comprise sending the respective probes to a server. At 430, operations 400 can comprise grouping probes of the respective probes having a same MAC address to form segments, wherein the segments correspond to the probes having the same MAC address. At 440, operations 400 can comprise identifying fingerprints of information elements of the mobile devices in the group of mobile devices, resulting in identified fingerprints. At 450, operations 400 can comprise grouping the segments according to the identified fingerprints, resulting in segment groups corresponding to a fingerprint of the identified fingerprints. At 460, operations 400 can comprise determining forward segments of consecutive segments of the segment groups, resulting in a constructed path of the mobile devices, wherein the forward segments can comprise segments of the consecutive segments with probes having later in time timestamps than other probes of other segments of the consecutive segments, and wherein the constructed path can comprise a chain of the consecutive segments in the segment groups. At 470, operations 400 can comprise storing the constructed path in a data store.

Optionally, the MAC addresses at blocks 410 and 430 of operations 400 can further comprise virtual MAC addresses.

In other embodiments, at block 460, the determining the forward segments can further comprise: determining increments of sequence numbers of the respective sequence numbers corresponding to the consecutive segments of the segment groups, resulting in incremented sequence numbers; and determining time gaps between first sequence numbers of the respective sequence numbers corresponding to first probes and second sequence numbers of the incremented sequence numbers corresponding to second probes having timestamps that are later in time than the first probes.

In alternative embodiments, at block 460, the determining the forward segments can further comprise: determining increments of sequence numbers of the respective sequence numbers corresponding to the consecutive segments of the segment groups, resulting in incremented sequence numbers; and comparing growth rates of the respective sequence numbers corresponding to the consecutive segments of the segment groups.

In another example embodiment, at block 440, the information elements can comprise an octet element identification field, an octet length field, and an element-specific information field.

In other embodiments, at block 460, the determining the forward segments can further comprise: determining increments of sequence numbers of the respective sequence numbers corresponding to the consecutive segments of the segment groups, resulting in incremented sequence numbers; and determining time gaps between first sequence numbers of the respective sequence numbers corresponding to first probes and second sequence numbers of the incremented sequence numbers corresponding to second probes having timestamps that are later in time than the first probes, wherein the first probes are probes with first timestamps that are first in time of all probes in a segment of the segments, and wherein the second probes have second timestamps that are last in time of all the probes in the segment of the segments.

In alternative example embodiments, at block 410, the receiving the respective probes can comprise: receiving the respective probes from the mobile devices on all available channels, and wherein at least one probe of the probes having the same MAC address in a segment of the segments is sent on a channel that is a different channel from other probes in the segment.

In another example embodiment, at block 450, the segment groups can comprise adjacent segments, wherein a first probe with a latest in time timestamp than other first probes in a first segment of the adjacent segments and a second probe with an earliest in time timestamp than other second probes in a second segment of the adjacent segments are consecutive timestamps, wherein a time between the adjacent segments is less than a defined number of seconds, and wherein a segment group of the segment groups can comprise segments having the probes of the respective probes with the same MAC addresses that are different from other MAC addresses of other segments of the segment group.

In other embodiments, at block 460, the determining the forward segments can comprise: determining increments of sequence numbers of the respective sequence numbers corresponding to the consecutive segments of the segment groups, resulting in incremented sequence numbers, and the determining the increments of the respective sequence numbers corresponding to the consecutive segments of the segment groups can comprise: incrementing the respective sequence numbers by one in response to a probe being received from a mobile device of the group of mobile devices with the same MAC address as a previously sent probe, resulting in at least one incremented sequence number.

In alternative embodiments, at block 450, the grouping the segments according to the identified fingerprints can comprise: chronologically concatenating the probes having the same MAC address according to ones of the respective timestamps corresponding to the probes; and inserting the segments into a dictionary representative of stored segments from previous groupings of segments.

In another example embodiment, at block 460, the determining the forward segments can comprise: determining the forward segments according to a sequence of ones of the respective probes with a lowest relative growth rate.

Figure 5:
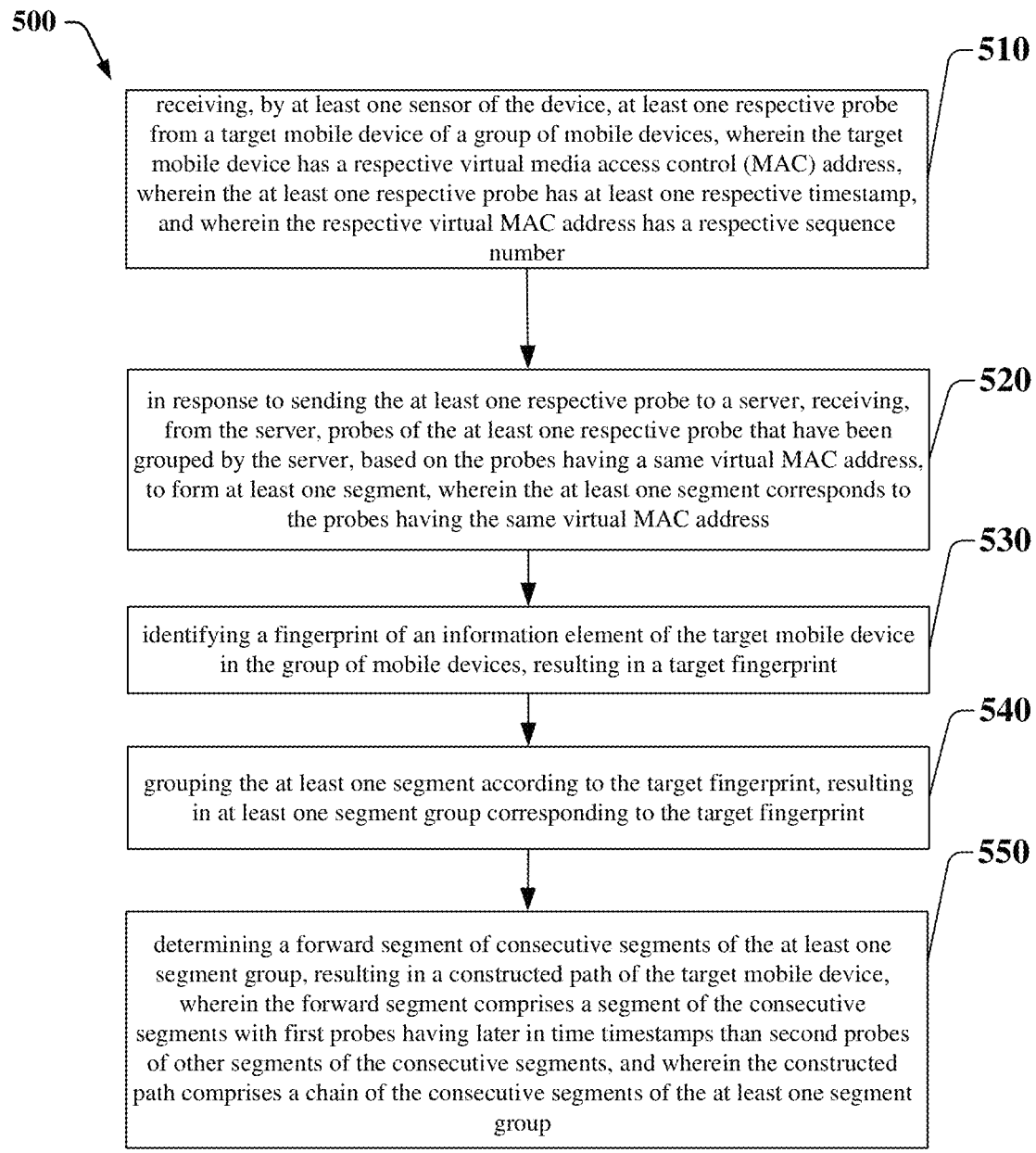
FIG. 5 illustrates an example flowchart of the operations of the computer-readable storage device illustrated in FIG. 3, the operations comprising constructing and/or recovering a path of a mobile device, where at least one probe is received from a target mobile device by a server, at least one probe having a same virtual MAC address is grouped to form at least one segment, a fingerprint of an information element of the target mobile device is identified, the at least one segment is grouped into at least one segment group according to a target fingerprint, and a forward segment of consecutive segments of the at least one segment group is determined, resulting in a constructed path of the target mobile device, in accordance with various example embodiments.

Now referring to FIG. 5, a sequence diagram of example operations 500 of computer-readable storage device 310 illustrated in FIG. 3, in accordance with various example embodiments. At 510, operations 500 can comprise receiving, by at least one sensor of the device, at least one respective probe from a target mobile device of a group of mobile devices, wherein the target mobile device has a respective virtual media access control (MAC) address, wherein the at least one respective probe has at least one respective timestamp, and wherein the respective virtual MAC address has a respective sequence number. At 520, operations 500 can comprise in response to sending the at least one respective probe to a server, receiving, from the server, probes of the at least one respective probe that have been grouped by the server, based on the probes having a same virtual MAC address, to form at least one segment, wherein the at least one segment corresponds to the probes having the same virtual MAC address. At 530, operations 500 can comprise identifying a fingerprint of an information element of the target mobile device in the group of mobile devices, resulting in a target fingerprint. At 540, operations 500 can comprise grouping the at least one segment according to the target fingerprint, resulting in at least one segment group corresponding to the target fingerprint. At 550, operations 500 can comprise determining a forward segment of consecutive segments of the at least one segment group, resulting in a constructed path of the target mobile device, wherein the forward segment can comprise a segment of the consecutive segments with first probes having later in time timestamps than second probes of other segments of the consecutive segments, and wherein the constructed path can comprise a chain of the consecutive segments of the at least one segment group.

Figure 6:
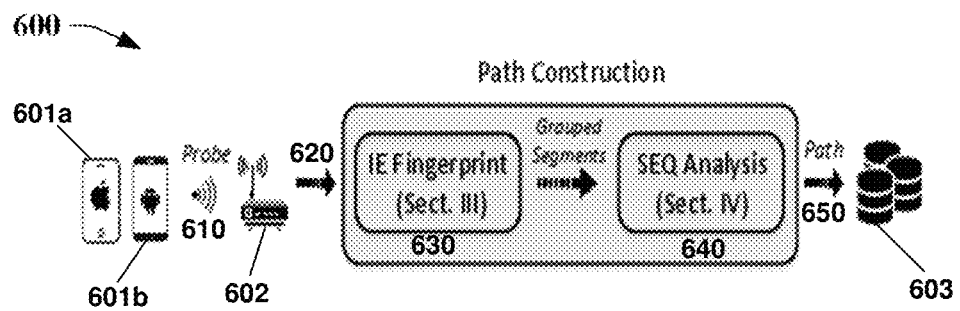
FIG. 6 illustrates a sequence diagram of the path construction of a mobile device, in accordance with various example embodiments.

FIG. 6 illustrates a sequence diagram of the path construction of a mobile device. iOS mobile device 601*a* and/or Android mobile device 601*b* send at least one probe 610. A server 602 receives the at least one probe 610 and groups the probes into segment segments 620. A fingerprint of iOS mobile device 601*a* and/or a fingerprint of Android mobile device 601*b* is determined and the segments are grouped into segment groups 630. A growth rate of sequence numbers corresponding to consecutive segments of the segment groups is compared and/or a time gap between a sequence number corresponding to an earlier in time probe and an incremented sequence number corresponding to a later in time probe is determined 640. A path of the iOS mobile device 601*a* and/or the Android mobile device 601*b* is constructed 650. The constructed path of the iOS mobile device 601*a* and/or the Android mobile device 601*b* is stored in a database 603.

Figure 7:
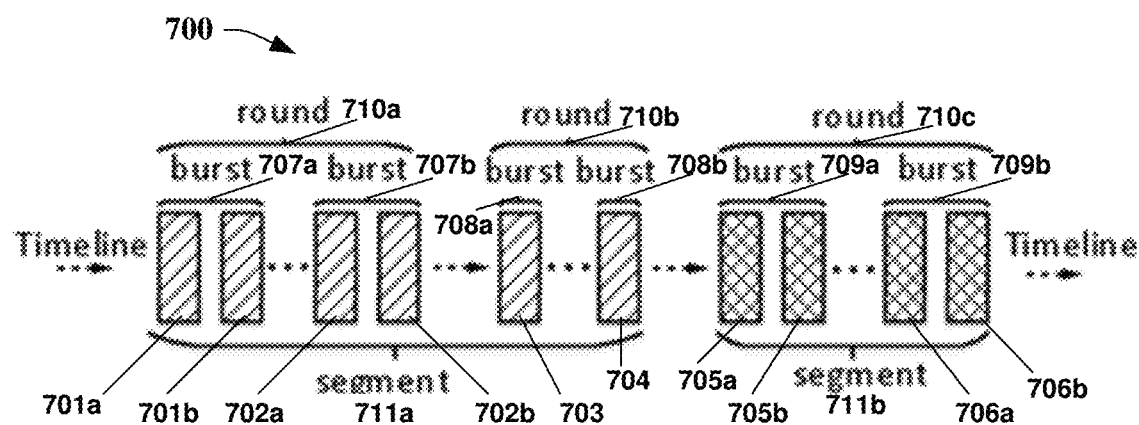
FIG. 7 illustrates a sequence diagram of a segment group that is used to construct a path of a mobile device, where the path is constructed through grouping of probes received from the mobile device into segments, and the grouping of the segments into segment groups, in accordance with various example embodiments.

FIG. 7 illustrates a sequence diagram illustrating a segment group that is used to construct a path of a mobile device, where the path is constructed through grouping of probes received from the mobile device into segments, and the grouping of the segments into segment groups. Probe 701*a* and probe 701*b* are probes sent on a same channel 707*a*, where probe 701*a* is received earlier in time and probe 701*b* is received later in time. Probe 702*a* and probe 702*b* are probes sent on a same channel 707*b*, where probe 702*a* is received earlier in time and probe 702*b* is received later in time. Probe 701a, probe 701b, probe 702a, and probe 702b are all sent in a same sequence round 710a. Probe 701a is received earliest in time and probe 702b is received latest in time (in sequence round 710a). Probe 703 is sent on channel 708a and probe 704 is sent on channel 708b. Probe 703 and probe 704 are both sent in sequence round 710b, where probe 703 is received earlier in time and probe 704 is received later in time. The probes in sequence round 710a and sequence round 710b are grouped into segment 711a, where probe 701a is received earliest in time and probe 704 is received latest in time. In segment 711a, all probes have a same virtual MAC address. Probe 705a and probe 705b are probes sent on same channel 709a, where probe 705a is received earlier in time and probe 705b is received later in time. Probe 706a and probe 706b are probes sent on same channel 709b, where probe 706a is received earliest in time and probe 706b is received later in time. Probe 705a, probe 705b, probe 706a, and probe 706b are all sent in a same sequence round 710c. The probes in sequence round 710c are all grouped into segment 711b, where probe 705a is received earliest in time and probe 706b is received latest in time. In segment 711b, all probes have a same virtual MAC address that is different from the virtual MAC address of the probes in segment 711a. The probes in segment 711a and the probes in segment 711b are grouped into a singular segment group, where probe 701a is received earliest in time and probe 706b is received latest in time. In this case, segment 711b is the forward segment.

In some embodiments, the number of probes sent on a same channel can be more than two probes, the number of different channels in a sequence round can be more than two channels, the number of sequence rounds in a segment can be more than two sequence rounds, and the number of segments in a segment group can be more than two segments.

In other embodiments, the segments in a segment group can have probes that have a same virtual MAC address.

Figure 8:
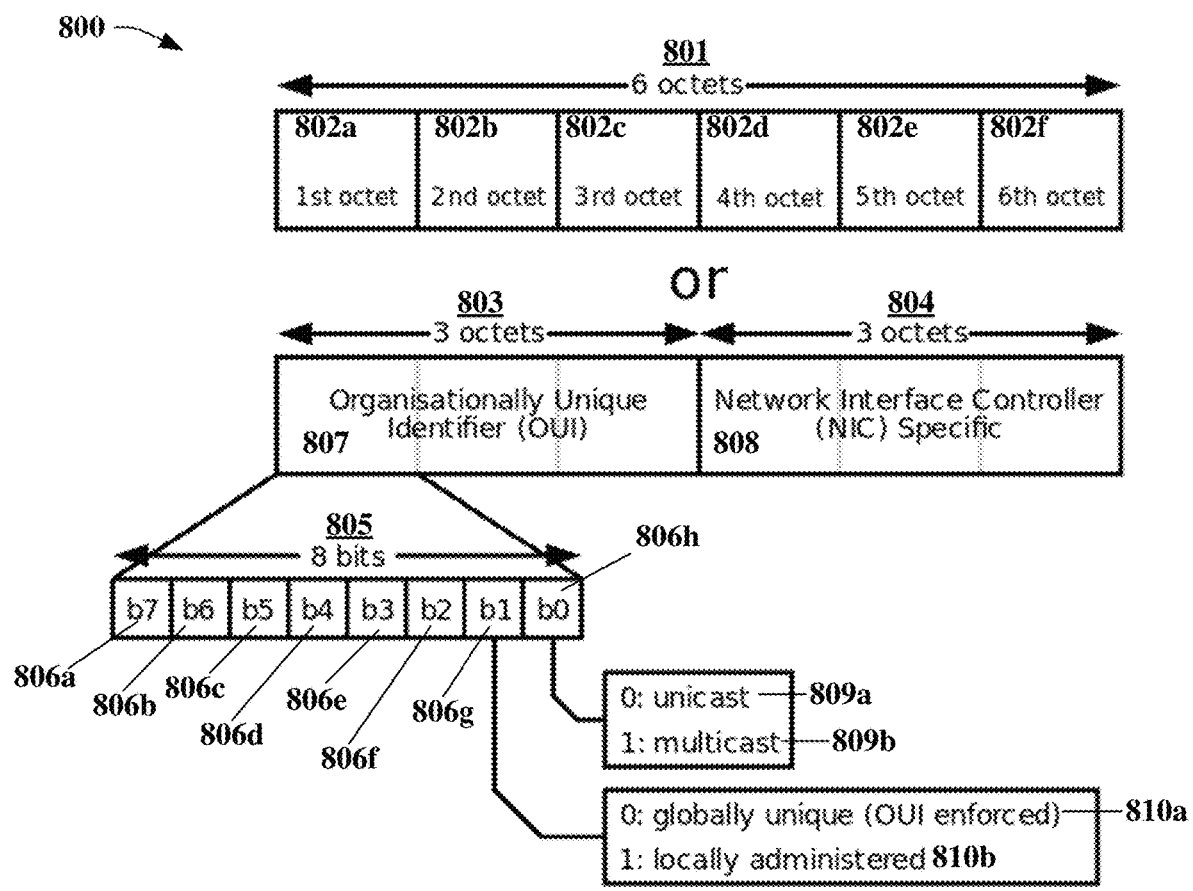
FIG. 8 illustrates a block diagram of a virtual MAC address of a mobile device, in accordance with various example embodiments.

FIG. 8 illustrates a block diagram of a virtual MAC address of a mobile device. A MAC address 800 of a mobile device (not pictured) is a unique identifier assigned to a network interface controller (NIC) 808. MAC address 800 can comprise a group of six octets 801 containing six groups of two hexadecimal digits (not pictured), where two of the hexadecimal digits are in first octet 802a, two of the hexadecimal digits are in second octet 802b, two of the hexadecimal digits are in third octet 802c, two of the hexadecimal digits are in fourth octet 802d, two of the hexadecimal digits are in fifth octet 802e, and two of the hexadecimal digits are in sixth octet 802f, The group of six octets 801 is further organized into group of three octets 803 and group of three octets 804, where group of three octets 803 can comprise an Organizationally Unique Identifier (OUI) 807 and group of three octets 804 can comprise Network Interface Controller (NIC) 808. Group of three octets 803 can further comprise first octet 802a, second octet 802b, and third octet 802c. Group of three octets 804 can further comprise fourth octet 802d, fifth octet 802e, and sixth octet 802f. First octet 802a can comprise 8 bits 805, which can comprise bit 7 (b7) 806a, bit 6 (b6) 806b, bit 5 (b5) 806c, bit 4 (b4) 806d, bit 3 (b3) 806e, bit 2 (b2) 806f, bit 1 (b1) 806g, and bit 0 (b0) 806h. Bit 0 (b0) 806h determines whether the MAC address 800 is unicast 809a or multicast 809b, where a zero bit value in bit 0 (b0) 806h results in a unicast 809a of the MAC address 800, and a one bit value in bit 0 (b0) 806h results in a multicast 809b of the MAC address 800. Bit 1 (b1) 806g determines whether the MAC address 800 is globally unique 810a or locally administered 810b, where a zero bit value in bit 1 (b1) 806g results in the MAC address 800 being globally unique 810a, and a one bit value in bit 1 (b1) 806g results in the MAC address 800 being locally administered 810b.

Figure 9:
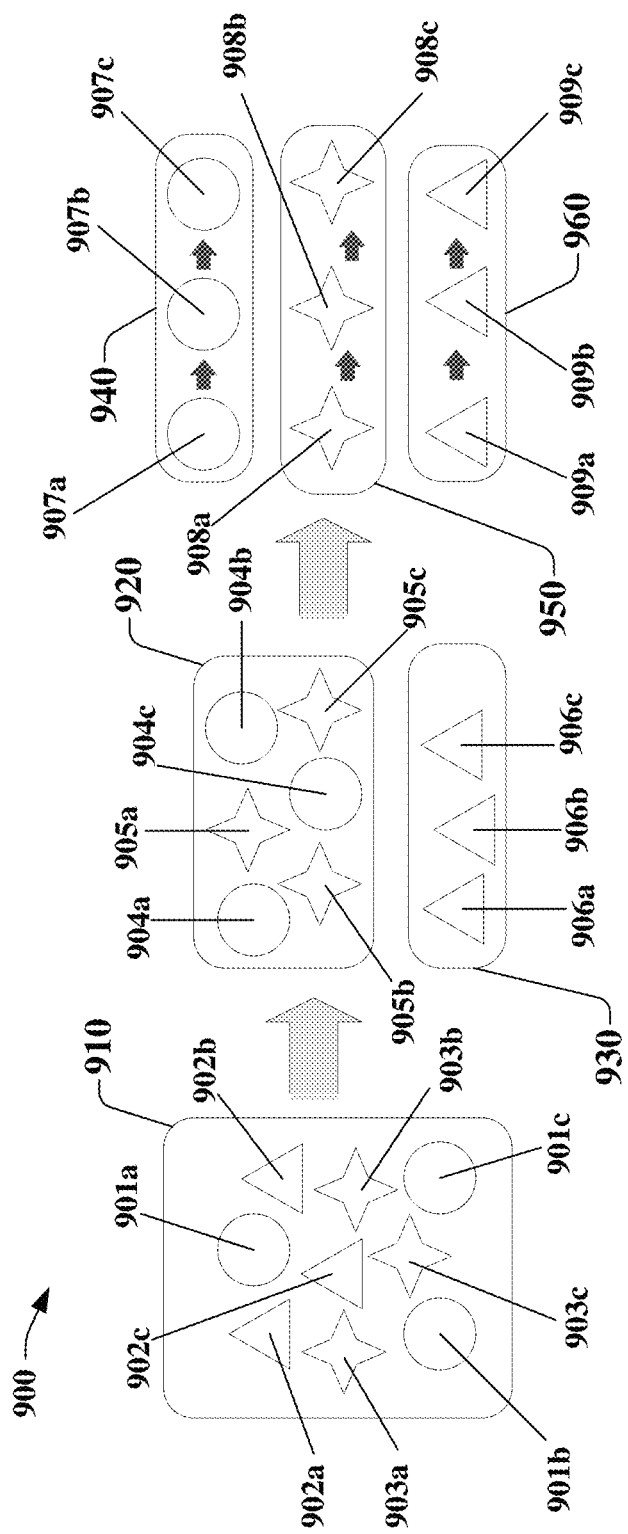
FIG. 9 illustrates a block diagram of identifying fingerprints of information elements and grouping segments into segment groups according to the identified fingerprints, in accordance with various example embodiments.

FIG. 9 illustrates a block diagram of identifying fingerprints of information elements (not pictured) and grouping segments into segment groups according to the identified fingerprints. At block 910, three mobile devices with different fingerprints of information elements are represented, where a first mobile device (not pictured) is represented by segments 901a-901c, all having a same fingerprint, a second mobile device (not pictured) is represented by segments 902a-902c, all having a same fingerprint, and a third mobile device (not pictured) is represented by segments 903a-903c, all having a same fingerprint. The segments are ungrouped in block 910. At block 920, segments 904a-904c, all having a same fingerprint, and segments 905a-905c, all having a same fingerprint, remain ungrouped. At block 930, the fingerprint of information elements corresponding to segments 906a-906c is identified. At block 940, segments 907a-907c are grouped into a segment group based on the fingerprint of segments 907a-907c. At block 950, segments 908a-908c are grouped into a segment group based on the fingerprint of segments 908a-908c.

At block 960, segments 909a-909c are grouped into a segment group based on the fingerprint of segments 909a-909c.

Figure 10:
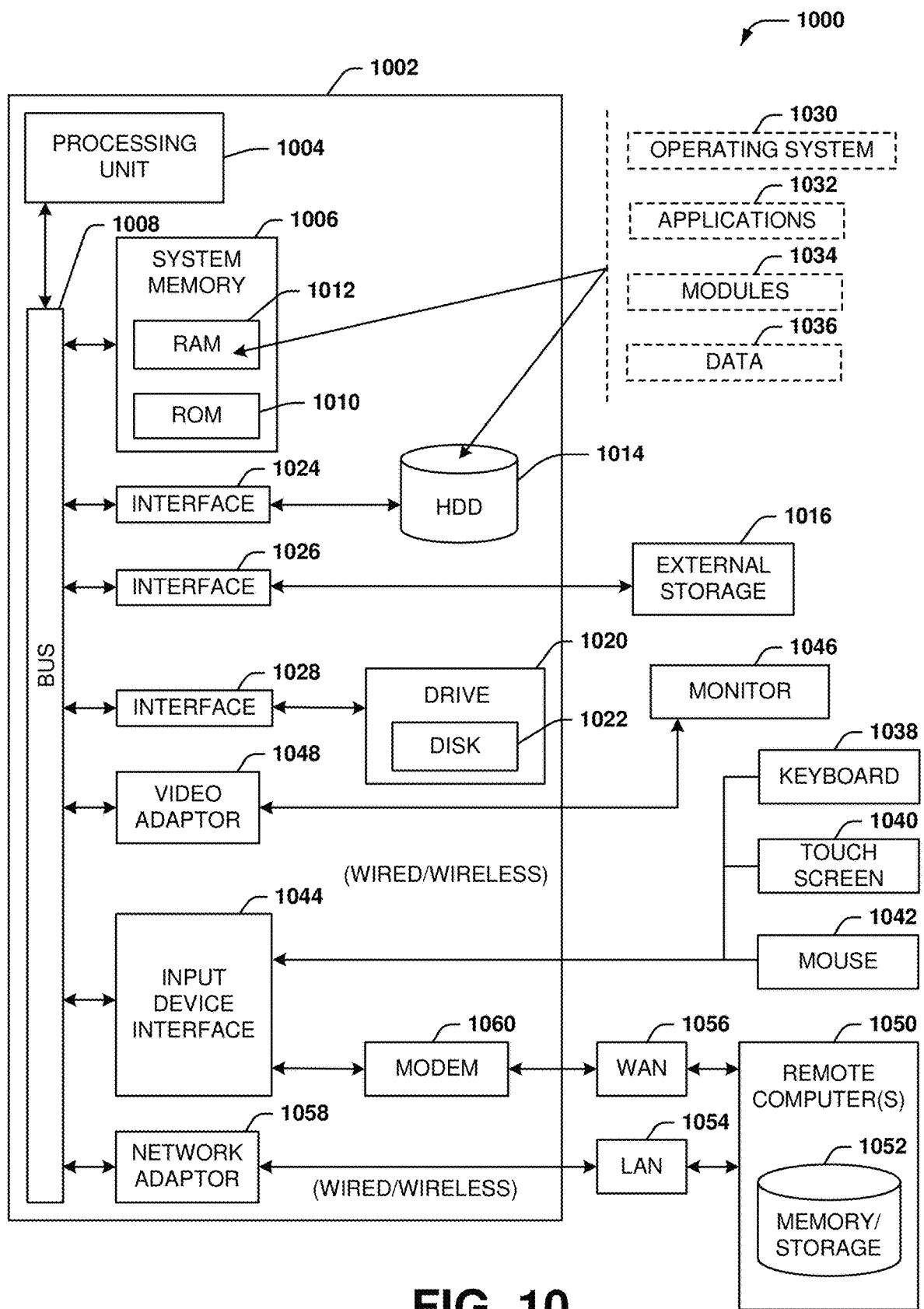
FIG. 10 illustrates a diagrammatic representation of a machine, in the example form, of a computer system within which a set of instructions, for causing the machine to perform any one or more of the methodologies discussed herein, may be executed.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of methods, devices, and computer-readable storage devices explained herein can constitute machine-executable instructions embodied within a machine, e.g., embodied in a computer-readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is typically intended to mean an inclusive "or" rather than an exclusive "or." That is, unless specified otherwise, or clear from context, "X employs A or B" is intended to mean any of the natural inclusive permutations. That is, if X employs A alone, X employs B alone, X employs C alone, X employs A and B alone, X employs B and C alone, X employs A and C alone, or X employs A and B and C, then "X employs A, B or C" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A but not aspect B, and a second embodiment that has aspect B but not aspect A, does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Further, the term "include," "has," "contains," or other similar terms, are intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

What has been described above includes examples of methods, devices, and computer-readable storage devices illustrative of the disclosed subject matter. It is, of course, not possible to describe every combination of components or methods herein. One of ordinary skill in the art may recognize that many further combinations and permutations of the claimed subject matter are possible. Illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Furthermore, embodiments can be combined, elements of embodiments can be excluded, etc. In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by at least one wireless fidelity (Wi-Fi) sensor, respective probes from mobile devices of a group of mobile devices, wherein the mobile devices in the group of mobile devices have respective media access control (MAC) addresses, wherein the respective probes have respective timestamps, wherein the respective MAC addresses have respective sequence numbers, and wherein the respective MAC addresses are respective randomized virtual MAC addresses;

grouping probes of the respective probes having a same MAC address to form at least one segment, wherein the at least one segment corresponds to the probes having same MAC addresses;

identifying at least one fingerprint of at least one information element of at least one mobile device of the group of mobile devices, resulting in at least one identified fingerprint, wherein the at least one information element comprises a Direct-Sequence Spread Spectrum (DSSS) parameter set and an extended supported rate;

grouping the at least one segment according to the at least one identified fingerprint, resulting in at least one segment group corresponding to an identified fingerprint of the at least one identified fingerprint;

determining at least one forward segment of consecutive segments of a segment group of the at least one segment group, resulting in a constructed path of the at least one mobile device, wherein the at least one forward segment comprises a segment of the consecutive segments with at least one probe having a timestamp that is later in time than other probes of other segments of the consecutive segments, and wherein the constructed path comprises a chain of the consecutive segments in the at least one segment group; and storing the constructed path in a database.

2. The method of claim 1, wherein the timestamp is a first timestamp, and wherein the determining the at least one forward segment further comprises:

determining an increment of at least one sequence number of the respective sequence numbers corresponding to the consecutive segments of the segment group of the at least one segment group, resulting in an incremented sequence number; and determining a time gap between a sequence number of the at least one sequence number corresponding to a first probe and the incremented sequence number corresponding to a second probe having a second timestamp that is later in time than the first probe.

3. The method of claim 1, wherein the determining the at least one forward segment further comprises:

determining an increment of at least one sequence number of the respective sequence numbers corresponding to the consecutive segments of the segment group of the at least one segment group, resulting in an incremented sequence number; and comparing a growth rate of the at least one sequence number corresponding to the consecutive segments.

4. The method of claim 1, wherein the at least one segment group comprises at least two adjacent segments, wherein a first probe with a latest in time timestamp than other first probes in a first segment of the at least two adjacent segments and a second probe with an earliest in time timestamp than other second probes in a second segment of the at least two adjacent segments are consecutive timestamps, wherein a time between the at least two adjacent segments is less than a defined number of seconds, and wherein the at least one segment group comprises the at least one segment having the probes of the respective probes with the same MAC address that is a different MAC address from other segments of the at least one segment group.

5. The method of claim 1, wherein the at least one information element comprises at least an octet element identification field, an octet length field, and an element-specific information field.

6. The method of claim 1, wherein the grouping of the at least one segment according to the at least one identified fingerprint comprises:

chronologically concatenating the probes having the same MAC address according to ones of the respective timestamps corresponding to the probes; and inserting the at least one segment into a dictionary, wherein the dictionary comprises stored segments from previous groupings of segments.

7. The method of claim 1, wherein the determining the at least one forward segment further comprises:

determining an increment of at least one sequence number of the respective sequence numbers corresponding to the consecutive segments of the segment group of the at least one segment group, resulting in an incremented sequence number, wherein the determining the increment comprises:

incrementing the at least one sequence number by one in response to a probe being received from a mobile device of the group of mobile devices with a MAC address that matches a previously sent probe, resulting in at least one incremented sequence number.

8. The method of claim 1, wherein the at least one information element further comprises a supported rate.

9. A device, comprising:

at least one wireless fidelity (Wi-Fi) sensor;

a processor; and a memory that stores executable instructions that, when executed by the processor, facilitate performance of operations, comprising:

receiving, by at least one wireless fidelity (Wi-Fi) sensor of the device, respective probes from mobile devices of a group of mobile devices, wherein the mobile devices have respective media access control (MAC) addresses, wherein the respective probes have respective timestamps, wherein the respective MAC addresses have respective sequence numbers, wherein the respective probes are received from the mobile devices via at least one channel, and wherein the respective MAC addresses are respective randomized virtual MAC addresses;

sending the respective probes to a server;

grouping probes of the respective probes having a same MAC address to form segments, wherein the segments correspond to the probes having the same MAC address;

identifying fingerprints of information elements of the mobile devices in the group of mobile devices, resulting in identified fingerprints, wherein at least one information element of the information elements comprises a Direct-Sequence Spread Spectrum (DSSS) parameter set and an extended supported rate;

grouping the segments according to the identified fingerprints, resulting in segment groups corresponding to a fingerprint of the identified fingerprints;

determining forward segments of consecutive segments of the segment groups, resulting in a constructed path of the mobile devices, wherein the forward segments comprise segments of the consecutive segments with probes having later in time timestamps than other probes of other segments of the consecutive segments, and wherein the constructed path comprises a chain of the consecutive segments in the segment groups; and storing the constructed path in a data store.

10. The device of claim 9, wherein the determining the forward segments further comprises:

determining increments of sequence numbers of the respective sequence numbers corresponding to the consecutive segments of the segment groups, resulting in incremented sequence numbers; and determining time gaps between first sequence numbers of the respective sequence numbers corresponding to first probes and second sequence numbers of the incremented sequence numbers corresponding to second probes having timestamps that are later in time than the first probes.

11. The device of claim 9, wherein the determining the forward segments further comprises:

determining increments of sequence numbers of the respective sequence numbers corresponding to the consecutive segments of the segment groups, resulting in incremented sequence numbers; and comparing growth rates of the respective sequence numbers corresponding to the consecutive segments of the segment groups.

12. The device of claim 9, wherein the determining the forward segments further comprises:

determining increments of sequence numbers of the respective sequence numbers corresponding to the consecutive segments of the segment groups, resulting in incremented sequence numbers; and determining time gaps between first sequence numbers of the respective sequence numbers corresponding to first probes and second sequence numbers of the incremented sequence numbers corresponding to second probes having timestamps that are later in time than the first probes, wherein the first probes are probes with first timestamps that are first in time of all probes in a segment of the segments, and wherein the second probes have second timestamps that are last in time of all the probes in the segment of the segments.

13. The device of claim 9, wherein the receiving the respective probes comprises receiving the respective probes from the mobile devices on all available channels, and wherein at least one probe of the probes having the same MAC address in a segment of the segments is sent on a channel that is a different channel from other probes in the segment.

14. The device of claim 9, wherein the segment groups comprise adjacent segments, wherein a first probe with a latest in time timestamp than other first probes in a first segment of the adjacent segments and a second probe with an earliest in time timestamp than other second probes in a second segment of the adjacent segments are consecutive timestamps, wherein a time between the adjacent segments is less than a defined number of seconds, and wherein a segment group of the segment groups comprises segments having the probes of the respective probes with the same MAC addresses that are different from other MAC addresses of other segments of the segment group.

15. The device of claim 9, wherein the information elements comprise an octet element identification field, an octet length field, and an element-specific information field.

16. The device of claim 9, wherein the grouping the segments according to the identified fingerprints comprises:

chronologically concatenating the probes having the same MAC address according to ones of the respective timestamps corresponding to the probes; and inserting the segments into a dictionary representative of stored segments from previous groupings of segments.

17. The device of claim 9, wherein the determining the forward segments further comprises:

determining increments of sequence numbers of the respective sequence numbers corresponding to the consecutive segments of the segment groups, resulting in incremented sequence numbers, and wherein the determining the increments of the respective sequence numbers corresponding to the consecutive segments of the segment groups comprises:

incrementing the respective sequence numbers by one in response to a probe being received from a mobile device of the group of mobile devices with the same MAC address as a previously sent probe, resulting in at least one incremented sequence number.

18. The device of claim 9, wherein the determining the forward segments comprises:

determining the forward segments according to a sequence of ones of the respective probes with a lowest relative growth rate.

19. The device of claim 9, wherein the at least one information element further comprises a supported rate.

20. A computer-readable storage device having executable instructions stored thereon that, in response to execution, cause a device comprising a processor to perform operations, comprising:

receiving, by at least one sensor of the device, at least one respective probe from a target mobile device of a group of mobile devices, wherein the target mobile device has a respective random virtual media access control (MAC) address, wherein the at least one respective probe has at least one respective timestamp, and wherein the respective random virtual MAC address has a respective sequence number;

in response to sending the at least one respective probe to a server, receiving, from the server, probes of the at least one respective probe that have been grouped by the server, based on the probes having a same random virtual MAC address, to form at least one segment, wherein the at least one segment corresponds to the probes having the same random virtual MAC address;

identifying a fingerprint of an information element of the target mobile device in the group of mobile devices, resulting in a target fingerprint, wherein the information element comprises a Direct-Sequence Spread Spectrum (DSSS) parameter set and an extended supported rate;

grouping the at least one segment according to the target fingerprint, resulting in at least one segment group corresponding to the target fingerprint; and determining a forward segment of consecutive segments of the at least one segment group, resulting in a constructed path of the target mobile device, wherein the forward segment comprises a segment of the consecutive segments with first probes having later in time timestamps than second probes of other segments of the consecutive segments, and wherein the constructed path comprises a chain of the consecutive segments of the at least one segment group.

\* \* \* \* \*